United States Patent
Childs et al.

(10) Patent No.: US 6,981,367 B2
(45) Date of Patent: Jan. 3, 2006

(54) HYDROGEN AND OXYGEN GENERATION FROM A WATER VAPOR CONTAINING EXHAUST

(75) Inventors: Paul Childs, Swampscott, MA (US); Anthony LaConti, Lynfield, MA (US); Keith D. Patch, Lexington, MA (US); Norman Dale Brinkman, Troy, MI (US); David R. Monroe, Bloomfield Hills, MI (US); David L. Hilden, Shelby Township, MI (US); Patrick G. Szymkowicz, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/606,194

(22) Filed: Jun. 25, 2003

(65) Prior Publication Data

US 2004/0261398 A1    Dec. 30, 2004

(51) Int. Cl.
 *F01N 3/00* (2006.01)
(52) U.S. Cl. .............................. 60/275; 60/274; 60/286; 60/292; 60/303; 123/1 A; 123/3; 422/187; 423/657
(58) Field of Classification Search ................. 60/274, 60/275, 284, 286, 292, 295, 300, 303; 123/1 A, 123/3, DIG. 12; 422/187; 423/657; 429/12, 429/20, 26
See application file for complete search history.

(56) References Cited

U.S. PATENT DOCUMENTS

| 5,272,871 | A | | 12/1993 | Oshima et al. |
| 5,813,222 | A | | 9/1998 | Appleby |
| 5,863,413 | A | * | 1/1999 | Caren et al. ................. 205/688 |
| 5,921,076 | A | | 7/1999 | Krutzsch et al. |
| 5,953,908 | A | | 9/1999 | Appleby |
| 5,964,089 | A | | 10/1999 | Murphy et al. |
| 6,122,909 | A | | 9/2000 | Murphy et al. |
| 6,272,849 | B1 | * | 8/2001 | Zanini-Fisher et al. ........ 60/275 |
| 6,293,092 | B1 | | 9/2001 | Ament et al. |
| 6,464,854 | B2 | * | 10/2002 | Andrews et al. ............ 205/628 |
| 6,659,049 | B2 | * | 12/2003 | Zagaja et al. ................... 123/3 |
| 6,716,398 | B2 | * | 4/2004 | Caren et al. ........... 422/186.04 |

* cited by examiner

*Primary Examiner*—Binh Q. Tran
(74) *Attorney, Agent, or Firm*—Dinsmore & Shohl LLP

(57) ABSTRACT

In accordance with one embodiment of the present invention, a device for generating hydrogen from a water vapor containing exhaust is provided. The device comprises an exhaust diverter and a hydrogen generation section. The exhaust diverter is configured to divert a portion of the exhaust to the hydrogen generation section. The hydrogen generation section comprises an electrolysis unit defining a hermetically sealed void volume configured to accumulate and store hydrogen. The exhaust diverter may be placed in communication with a heat exchanger configured to increase a fractional relative humidity of the diverted exhaust by cooling the diverted exhaust. In accordance with 37 CFR 1.72(b), the purpose of this abstract is to enable the United States Patent and Trademark Office and the public generally to determine quickly from a cursory inspection the nature and gist of the technical disclosure. The abstract will not be used for interpreting the scope of the claims.

31 Claims, 4 Drawing Sheets

HYDROGEN AND OXYGEN GENERATION FROM A WATER VAPOR CONTAINING EXHAUST

CROSS-REFERENCE TO RELATED APPLICATIONS

The present application is related to co-pending U.S. patent application Ser. No. 10/606,193 filed concurrently herewith.

BACKGROUND OF THE INVENTION

The present invention relates to the generation of process gases and to the use of those process gases in specialized applications. More specifically, the present invention relates to various schemes for the generation of substantially pure hydrogen and to a variety of applications employing the hydrogen.

BRIEF SUMMARY OF THE INVENTION

In accordance with one embodiment of the present invention, a device for generating hydrogen from a water vapor containing exhaust is provided. The device comprises an exhaust diverter and a hydrogen generation section. The exhaust diverter is configured to divert a portion of the exhaust and deliver the diverted exhaust to the hydrogen generation section. The hydrogen generation section comprises an electrolysis unit defining a hermetically sealed void volume configured to accumulate and store hydrogen generated by said electrolysis unit. The hydrogen generation section is configured to deliver said hydrogen at a hydrogen output of said electrolysis unit.

In accordance with another embodiment of the present invention, a heat exchanger is configured to increase the fractional relative humidity of the diverted exhaust by cooling the diverted exhaust. The heat exchanger may be provided with additional hardware, such as one or more semi-permeable membranes, for extracting or concentrating water in the diverted exhaust.

In accordance with yet another embodiment of the present invention, a device is provided comprising an engine that generates torque and a nitrogen oxide containing exhaust, at least one peripheral system, and a $NO_X$ removal system for removing nitrogen oxides from the exhaust. The $NO_X$ removal system comprises a $NO_X$ treatment section, an exhaust diverter, and a hydrogen generation section. The $NO_X$ treatment section is configured to remove nitrogen oxides from the exhaust. The exhaust diverter is configured to divert a portion of the exhaust to the hydrogen generation section. The hydrogen generation section is configured to deliver hydrogen to said $NO_X$ treatment section and to generate oxygen as a byproduct of hydrogen generation and deliver said oxygen with said diverted exhaust to the peripheral system.

Additional embodiments of the present invention may be gleaned from the following detailed description of the invention. Accordingly, it is an object of the present invention to provide for improved schemes for the generation of process gases and to the use of those process gases in specialized applications. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
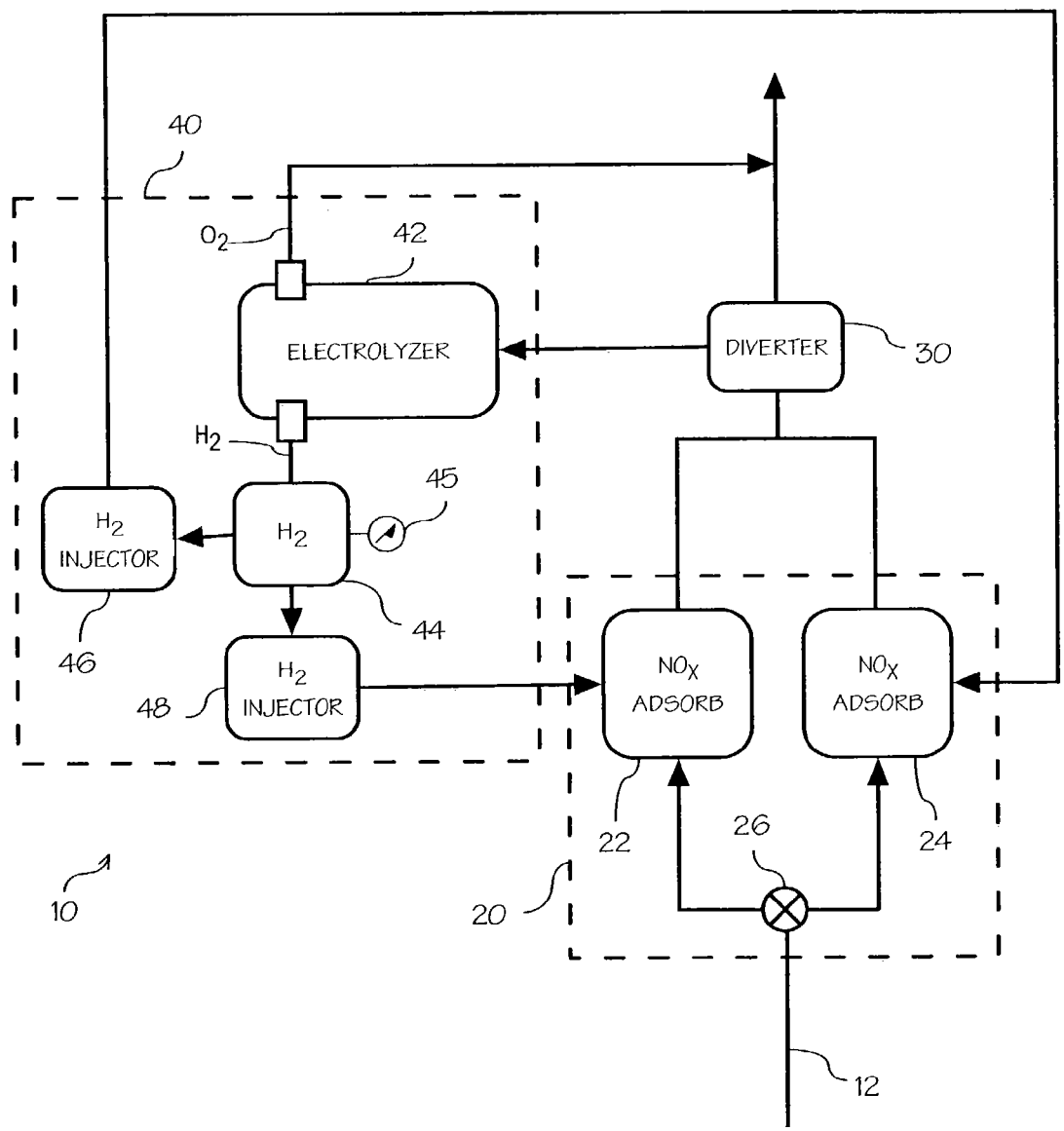
FIG. 1 is a schematic illustration of a $NO_X$ removal system according to one embodiment of the present invention.

Referring initially to FIG. 1, a $NO_X$ removal system 10 according to one embodiment of the present invention is illustrated. The $NO_X$ removal system 10 removes nitrogen oxides from a nitrogen oxide containing exhaust 12. The $NO_X$ removal system 10 comprises a $NO_X$ treatment section 20, a diverter 30, and a hydrogen generation section 40.

The $NO_X$ treatment section 20 is configured to remove nitrogen oxides from the exhaust 12. Of course, as will be appreciated by those practicing the present invention and familiar with $NO_X$ treatment of exhaust, reference to the removal of nitrogen oxides is not intended to be limited to complete or entire removal of all nitrogen oxides from the exhaust. Rather, the extent to which the $NO_X$ treatment section 20 affects removal of the nitrogen oxides from the exhaust depends upon the operating characteristics of the $NO_X$ treatment section 20.

The diverter 30 is configured to enable delivery of water to the hydrogen generation section 40 by, for example, extracting water from the exhaust and delivering the extracted water to the hydrogen generation section 40. Of course, it is contemplated that a variety of suitable diversion schemes may be utilized to enable delivery of water to the hydrogen generation section 40 including, but not limited to, liquid phase selective water diversion, vapor phase selective water diversion, exhaust diversion, etc. In the illustrated embodiment, the diverter, which may comprise a semi-permeable vapor separation membrane unit, a condensation unit, combinations thereof, or any other suitable structure for enabling the delivery of water to the hydrogen generation section 40, is positioned downstream of the $NO_X$ treatment section 20 but may be positioned anywhere along the exhaust stream. As is described in further detail with reference to FIGS. 3 and 4, the diverter may merely comprise an exhaust diverter that is not selective of, or preferential to, water or water vapor but nevertheless enables the delivery of water to the hydrogen generation section 40 by directing water-containing exhaust to the hydrogen generation section 40.

The present inventors have recognized that the processes and mechanisms of a variety of $NO_X$ treatment schemes may be optimized with intermittent exposure to hydrogen. For example, hydrogen exposure can facilitate both catalyst regeneration and sulfate regeneration in a $NO_X$ treatment scheme. Typically, sulfate regeneration requires less frequent but more prolonged exposure to hydrogen than catalyst regeneration. Accordingly, the hydrogen generation section 40 is configured to deliver hydrogen to the $NO_X$ treatment section 20 for regeneration of the $NO_X$ treatment section 20.

In the illustrated embodiment, the hydrogen generation section comprises an electrolysis unit 42 and a hydrogen storage reservoir 44 fed by a hydrogen output of the electrolysis unit 42. The hydrogen generation section 40 may comprise a pressure monitor 45 configured to monitor the accumulation and storage of hydrogen therein. Hydrogen injectors 46, 48 may also be provided as a means of controlling delivery of hydrogen stored in the reservoir 44. As will be clear from the following description of the present invention, it is contemplated that the hydrogen storage reservoir 44 and even hardware configured to perform the function of the hydrogen injectors 46, 48, may be provided external to or internal of the electrolysis unit 42. Specifically, in FIG. 1 the hydrogen storage reservoir 44 and the hydrogen injectors 46, 48, are illustrated external to the electrolysis unit 42 while in FIG. 4, the hydrogen storage reservoir 44 is illustrated schematically as internal of the electrolysis unit 42.

The $NO_X$ removal system 10 is configured such that the delivery of the hydrogen to the $NO_X$ treatment section 20 is substantially isolated from the delivery of a substantial amount of oxygen, which may exist in the exhaust 12, for example, to the $NO_X$ treatment section 20. In this manner, the adverse effects of reactions of the hydrogen from the hydrogen generation section 40 and oxygen in the exhaust or from another source may be avoided. For the purposes of defining and describing the present invention, it is noted that a "substantial" amount of oxygen may be quantified as an approximation of the amount of oxygen necessary to result in significant adverse effects to treatment operations in the $NO_X$ treatment section 20 due to reactions of the oxygen with hydrogen from the hydrogen generation section 40.

According to one embodiment of the present invention, the $NO_X$ treatment section 20 may define at least two independent $NO_X$ treatment zones 22, 24. The $NO_X$ treatment zones 22, 24 are illustrated in FIG. 1 as independent $NO_X$ adsorbers, which typically utilize multiple catalyst beds to affect removal of the nitrogen oxides from the exhaust 12. However, it is noted that any suitable scheme where removal of nitrogen oxides from the exhaust 12 is aided by hydrogenous regeneration may be employed without departing from the scope of the present invention. In the context of $NO_X$ adsorbers, the independent $NO_X$ treatment zones 22, 24 may be defined by independent $NO_X$ adsorbers, by suitably isolated multiple catalyst beds packaged as a single $NO_X$ adsorber unit, or by any other suitable means. It is contemplated that other embodiments of the present invention may be configured with only one $NO_X$ treatment zone, as opposed to two independent $NO_X$ treatment zones. In addition, a plurality of $NO_X$ adsorbers may be arranged in series to help address specific performance issues relating to cold start or other conditions.

As is illustrated in FIG. 1, the $NO_X$ removal system 10 is configured to deliver the exhaust 12 to one of the independent $NO_X$ treatment zones 22, 24 on a selective basis. To this end, the $NO_X$ treatment section 20 includes a flow diverter valve 26 or any other suitable arrangement for controlling the delivery of the exhaust 12 to one treatment zone or the other. The $NO_X$ removal system 10 is also configured to deliver the hydrogen from the hydrogen generation section 40 to one of the independent $NO_X$ treatment zones 22, 24 on a selective basis. To this end, the hydrogen generation section 40 is configured to accumulate and store hydrogen and to deliver hydrogen to one of the independent $NO_X$ treatment zones 22, 24 on a selective basis. For example, in the illustrated embodiment, each of the hydrogen injectors 46, 48 is in communication with different independent $NO_X$ treatment zones 22, 24 of the $NO_X$ treatment section 20. In this manner, the hydrogen and the exhaust may each be delivered to different ones of the independent $NO_X$ treatment zones 22, 24 on a selective basis.

Figure 2:
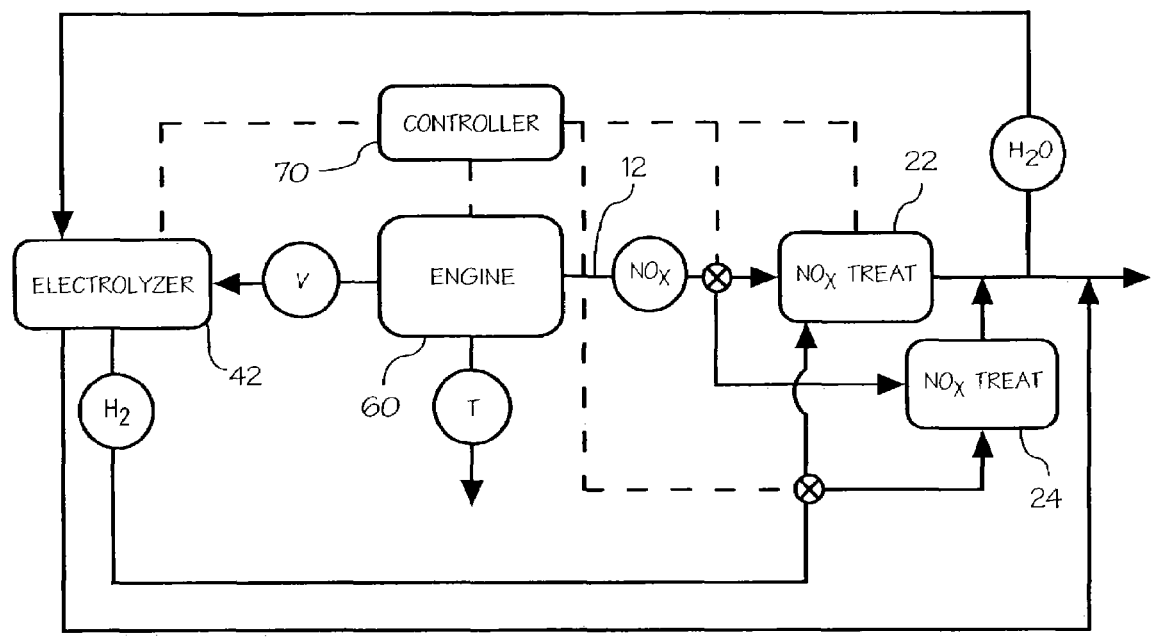
FIG. 2 is a schematic representation of a vehicle incorporating a $NO_X$ removal system according to one embodiment of the present invention.

Referring now to FIG. 2, the present invention is illustrated in the context of an integrated device where a device 50, such as a vehicle or a generator or other stationary device, powered by an engine 60 is provided with a $NO_X$ removal system according to the present invention. A suitable programmable controller 70 is also provided for integrating the operations and functions of the device 50, engine 60 and the $NO_X$ removal system. The engine 60 generates torque T, exhaust containing nitrogen oxides $NO_X$, and, an electric potential V with the aid of an electrical generator or other suitable device. In some applications, the engine will comprise a diesel engine or other type of lean exhaust engine where excess oxygen is present in the exhaust. For example, the oxygen content of the exhaust may be between about 1 and about 20 percent, by weight.

The controller 70 is programmed to control delivery of the exhaust and the hydrogen to the $NO_X$ treatment zones 22, 24 to affect regeneration of the treatment zones while ensuring that the delivery of the hydrogen to the respective treatment zones 22, 24 is substantially isolated from the delivery of the exhaust to the respective treatment zones 22, 24. One suitable regeneration scheme utilizes the controller to monitor a condition indicative of $NO_X$ removal in the respective treatment zones 22, 24 and divert exhaust from the treatment zone when the treatment zone approaches its nitrogen oxide removal capacity. For example, the controller 70 could be programmed to monitor the cumulative torque output of the engine, the duration for which a selected treatment zone is exposed to exhaust, the $NO_X$ level of the exhaust downstream of the treatment zone, etc.

The controller 70 is programmed to cause the hydrogen to be delivered to a selected treatment zone after exhaust is diverted from the treatment zone. In this manner, treatment zones may be automatically regenerated by exposure to hydrogen after they reach an operational threshold that is near the nitrogen oxide removal capacity of the treatment zone. Successfully regenerated treatment zones are subsequently made available for further exposure to exhaust.

The controller 70 may also be programmed to monitor the accumulation and storage of hydrogen in the hydrogen generation section as a means of avoiding the generation of excess hydrogen in the hydrogen generation section 40. To this end, the pressure monitor 45 illustrated in FIG. 1 may be placed in communication with the controller 70.

In a vehicle provided with an automated $NO_X$ removal system according to the present invention, a nitrogen oxide containing exhaust is directed through the $NO_X$ treatment section 22 to cause nitrogen oxides to be removed from the exhaust 12. Delivery of the exhaust 12 to the $NO_X$ treatment section 20 and delivery of hydrogen generated by the hydrogen generation section 40 to the $NO_X$ treatment section 20 are controlled such that the delivery of the hydrogen is substantially isolated from the delivery of the exhaust 12.

Specifically, the removal of nitrogen oxides by one treatment zone of the $NO_x$ treatment section 20 may be monitored and used to control the diversion of exhaust from the treatment zone when the treatment zone approaches its nitrogen oxide removal capacity. The exhaust may be diverted, for example, to a previously regenerated independent treatment zone. Subsequently, hydrogen is delivered to the treatment zone from which the exhaust was diverted. Delivery of the hydrogen to the treatment zone may be interrupted prior to diversion of the exhaust back to the treatment zone to maintain isolation of the exhaust and the hydrogen. To preserve operational efficiency and reduce burden on the hydrogen generation section 40, the hydrogen may merely be delivered to the selected treatment zone for an amount of time sufficient to regenerate the nitrogen oxide removal capacity of the treatment zone. The diverted exhaust may be diverted back to the initial treatment zone at any time following regeneration of the zone but prior to the time at which the independent treatment zone reaches its nitrogen oxide removal capacity.

Figure 3:
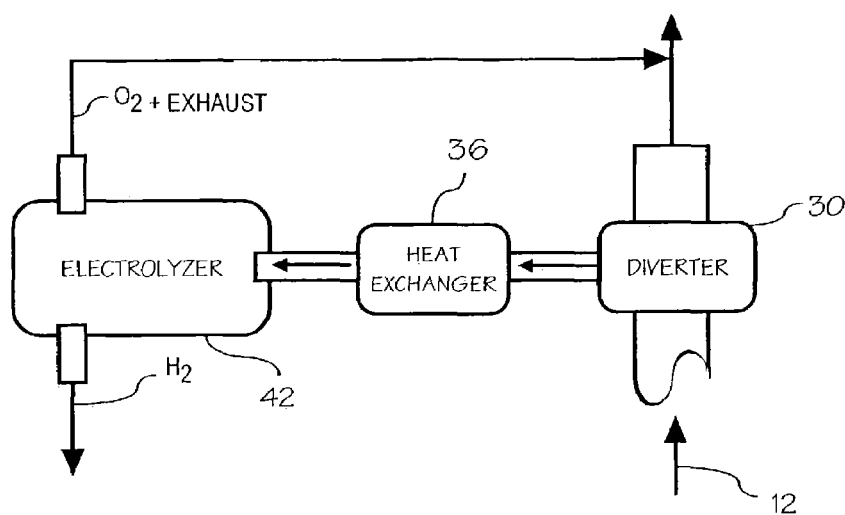
FIG. 3 is a schematic illustration of a hydrogen generation device according to one embodiment of the present invention.

Referring now to FIG. 3, the diverter 30 illustrated in FIG. 1 may be configured to divert a portion of the exhaust 12 to a heat exchanger 36 configured to increase the fractional relative humidity of the diverted exhaust 12. The heat exchanger 36, which may, for example, comprise an air-to-air heat exchanger, is configured to increase the fractional relative humidity of the diverted exhaust by at least as much as is required for suitable electrolyzer operation. For example, the heat exchanger may be configured to increase the fractional relative humidity of the diverted exhaust to about 80% or, in other cases, by at least one order of magnitude. The heat exchanger may be provided with, or placed in communication with, additional hardware, such as one or more permeable membranes, for extracting or concentrating water in the diverted exhaust.

It is contemplated that a sufficient supply of water may be generated by configuring the diverter 30 to divert less than about 25% of the exhaust, although the portion to be diverted will vary depending upon the specific operating conditions involved. The diverter may comprise any structure suitable for apportioning and directing respective portions of an exhaust flow. The controller 70, diverter, and any suitable associated hardware may be configured such that exhaust diversion is deactivated where the vehicle body decelerates since there is often little usable water in the exhaust under such conditions.

Figure 4:
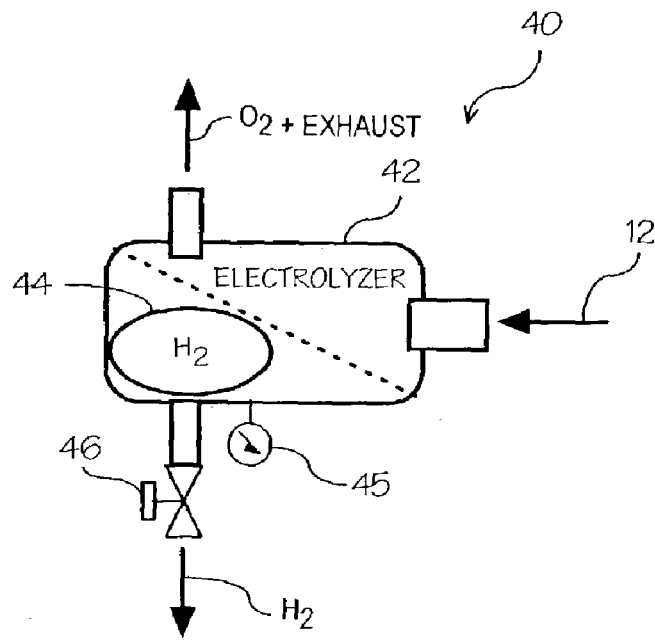
FIG. 4 is a schematic illustration of an electrolysis unit according to one embodiment of the present invention.

Referring to FIG. 4, a hydrogen generation section 40 for generating hydrogen and oxygen from a water vapor containing exhaust 12 is illustrated. The hydrogen generation section 40 comprises an electrolysis unit 42 defining a hermetically sealed void volume 44 configured to accumulate and store hydrogen generated by the electrolysis unit 42. Hydrogen is delivered at a hydrogen output of the electrolysis unit 42. It is contemplated that if water, as opposed to merely a water vapor containing exhaust, were delivered to the hydrogen generation section 40, an exhaust of substantially pure oxygen could also be generated by the hydrogen generation section. In which case, oxygen generated in the electrolysis unit 42 may be delivered at an oxygen output of the hydrogen generation section 40 and put to an additional use or may merely be recombined with the exhaust. For example, where the exhaust is generated by an internal combustion engine, the oxygen may be delivered to the engine to enhance combustion, or delivered to one or more of a variety of components of the engine's emission control system to improve emissions control performance. Further examples of the constructive uses for the oxygen output are discussed below with reference to FIG. 5.

As is discussed above with reference to the pressure monitor 45 of FIG. 1, a pressure monitor 45 may also be provided in the embodiment of FIG. 4 to monitor the accumulation and storage of hydrogen within the void volume 44. One or more hydrogen injectors 46 or another suitable valve assembly is also provided and is configured to control release of hydrogen stored within the void volume 44. As is discussed above with reference to FIG. 2, a controller (not shown in FIG. 4) may be provided and configured to monitor accumulation and storage of hydrogen in the void volume 44. The void volume 44 may be defined within and by the body and structure of the electrolysis unit 42.

Figure 6A:
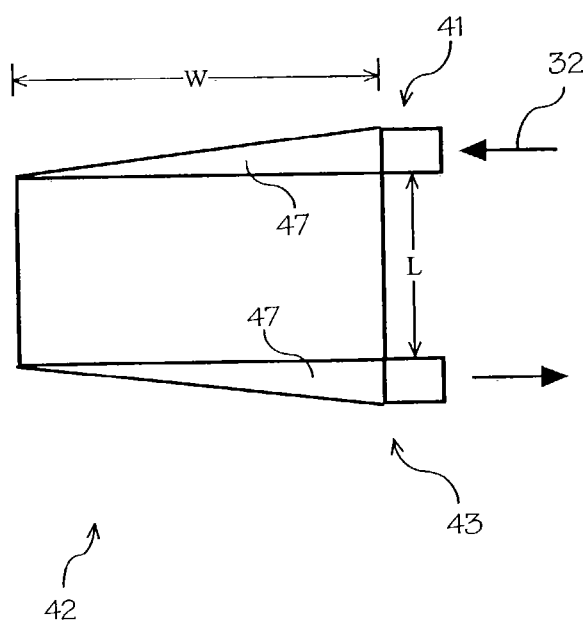
FIGS. 6A and 6B illustrate the construction of a heat exchanger according to one embodiment of the present invention.
Figure 6B:
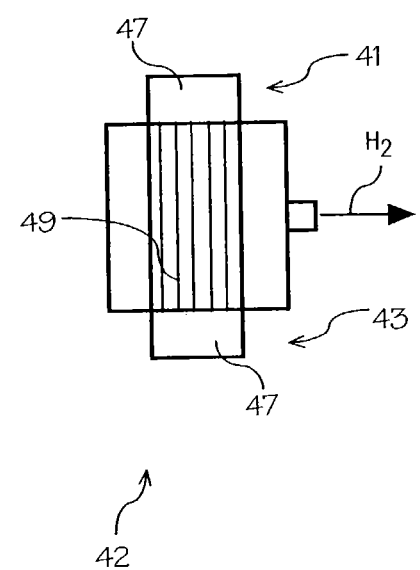

Referring to FIGS. 6A and 6B, the electrolysis unit 42 may comprise hermetically sealed external box type manifolds 47 on the exhaust input and output sides 41, 43 of the electrolysis unit 42. The presence of the box type manifold 47 on the exhaust input sides 41 of the electrolysis unit 42 tends to increase the efficiency of the electrolysis operation.

It may be preferable to ensure that the width dimension W of the electrolysis unit 42 is larger than, or at least twice as large as, the length dimension L of the electrolysis unit 42. In this manner, the hydrogen generation efficiency of the electrolysis operation may be optimized by increasing the area of the free flow region at the frontal area of the flow field grooves 49 within the unit 42. As is illustrated schematically in FIGS. 6A and 6B, the flow field grooves 49 defined by the electrolysis unit extend at least as far as the external box type manifolds 47 on the input and output sides 41, 43 of the unit 42. To optimize flow field uniformity, the external box type manifolds 47 may be tapered from a maximum cross sectional area at an input end of the manifold 47 to a minimum cross sectional area at an terminal end of the manifold 47.

The preferred capacity of the void volume 44 illustrated in FIG. 4 and the hydrogen storage reservoir illustrated in FIG. 1 depends in large part upon the requirements of the particular system in which the hydrogen generation section 40 is utilized. For example, characterizing the specific volumetric capacity in terms of the cell area of the electrolysis unit, it is noted that suitable capacities include, but are not limited to, volumes of about 0.1 mL/cm$^2$ at a pressure of about 300 psi (2100 kPa) or about 0.2 mL/cm$^2$ at a pressure of about 50 psi (350 kPa). More generally, volumes of between about 0.01 mL/cm$^2$ and 10 mL/cm$^2$ at pressures of between about 5 psi (35 kPa) and about 1500 psi (10,500 kPa) are also likely to be suitable for many applications. In additional embodiments of the present invention, suitable volumetric and pressure capacities of the hydrogen storage components include about 1 L and at least about 300 psi (2100 kPa), respectively. Alternatively, the volumetric and pressure capacities may be less than about 2 L and at least about 200 psi (1400 kPa). More generally, volumetric and pressure capacities may be between about 50 mL and about 5 L and about 200 psi (1400 kPa) and about 1500 psi (10,500 kPa), respectively.

Regarding the operational characteristics of the electrolysis unit 42, where the exhaust is characterized by a fractional relative humidity of about 1 to about 3 percent, there are advantages to utilizing an electrolysis unit 42 that is configured to generate a substantial amount of hydrogen and oxygen from an input exhaust characterized by a fractional relative humidity of about 1 to about 3 percent. In low humidity applications, it will be advantageous to ensure that the hydrogen generation section 40 comprises an electrolysis unit 42 configured to generate a substantial amount of hydrogen and oxygen from an input exhaust characterized by a fractional relative humidity of about 3% at about 125° C.

In still other applications, it will be preferable to thermally couple the electrolysis unit 42 to the exhaust duct of the system, providing a means by which the waste heat of the electrolysis unit can be absorbed in the exhaust gas.

Regarding the hydrogen generation capacity of the electrolysis unit 42, in applications where the unit is utilized in cooperation with a $NO_x$ treatment system of an internal combustion engine, it will be sufficient to ensure that the electrolysis unit 42 is arranged to generate in the vicinity of at least about 5 mg/s for smaller engines (about 3 L displacement), in the vicinity of at least about 10 mg/s for larger engines (about 6 L displacement)—with the understanding that larger generation rates will typically be advantageous.

Figure 5:
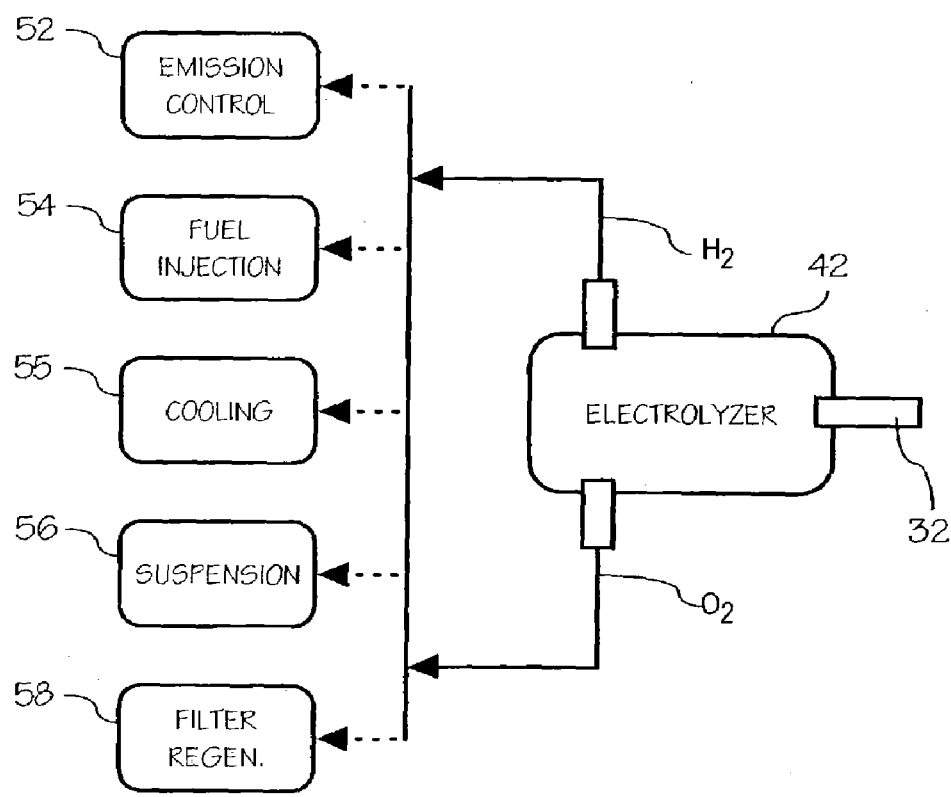
FIG. 5 is a schematic illustration of a hydrogen generation device integrated with a series of peripheral devices according to one embodiment of the present invention.

Referring to FIG. 5, the hydrogen generation section 40 may be configured to deliver hydrogen and/or oxygen, which is generated as a byproduct of hydrogen generation, to one or more peripheral systems in addition to the $NO_x$ treatment section 20. Specifically, the peripheral system may comprise an emission control system 52 and oxygen may be delivered to one or more components of the system to improve the performance of those components. The peripheral system may comprise a fuel injection system 54 and hydrogen or oxygen may be delivered thereto to enhance combustion. Additionally, the peripheral system may comprise an engine cooling system 55 or a suspension system 56 for the vehicle. The peripheral system may also comprise a filter regeneration system 58, where a hydrogen or oxygen supply may be used to clean or otherwise regenerate a particulate or other type of filter in the exhaust line or any other gaseous input or output line.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A device for generating hydrogen from a water vapor containing exhaust, said device comprising an exhaust diverter and a hydrogen generation section, wherein:
   said exhaust diverter is configured to divert a portion of said exhaust and deliver said diverted exhaust to said hydrogen generation section;
   said hydrogen generation section comprises an electrolysis unit; and
   said hydrogen generation section is configured to deliver said hydrogen at a hydrogen output of said electrolysis unit and to return an oxygen-enriched exhaust to a non-diverted portion of said exhaust.

2. A device as claimed in claim 1 wherein said electrolysis unit defines a hermetically sealed void volume configured to accumulate and store hydrogen generated by said electrolysis unit.

3. A device as claimed in claim 2 wherein said void volume is characterized by a volumetric capacity of about 0.01 mL per square centimeter of electrolysis unit cell area at a pressure of about 300 psi (2100 kPa).

4. A device as claimed in claim 2 wherein said void volume is characterized by a volumetric capacity of about 0.2 mL per square centimeter of electrolysis unit cell area at a pressure of about 50 psi (2100 kPa).

5. A device as claimed in claim 2 wherein said void volume is characterized by a volumetric capacity of between about 0.01 mL and about 10 mL per square centimeter of electrolysis unit cell area at pressures of between about 5 psi (35 kPa) and about 1500 psi (10,500 kPa).

6. A device as claimed in claim 2 wherein said hydrogen generation section further comprises a pressure monitor configured to monitor said accumulation and storage of hydrogen within said void volume.

7. A device as claimed in claim 2 wherein said hydrogen generation section comprises at least one hydrogen injector configured to control release of hydrogen stored within said void volume.

8. A device as claimed in claim 2 wherein said device further comprises a controller configured to monitor accumulation and storage of hydrogen in said void volume.

9. A device as claimed in claim 8 wherein monitoring of said accumulation and storage of hydrogen is enabled through a pressure monitor in communication with said controller.

10. A device as claimed in claim 9 wherein said pressure monitor is configured to monitor pressure of said hermetically sealed void volume.

11. A device as claimed in claim 1 wherein said electrolysis unit is thermally coupled to an exhaust duct carrying said exhaust.

12. A device as claimed in claim 1 wherein said electrolysis unit is configured to generate a substantial amount of hydrogen from a diverted exhaust characterized by a fractional relative humidity of about 1 to about 3 percent.

13. A device as claimed in claim 1 wherein said hydrogen generation section comprises an electrolysis unit configured to generate a substantial amount of hydrogen from a diverted exhaust characterized by a fractional relative humidity of about 3% at about 125° C.

14. A device as claimed in claim 1 wherein said hydrogen generation section comprises an electrolysis unit configured to generate a substantial amount of hydrogen from a diverted exhaust characterized by a fractional relative humidity of about 80% at about 92° C.

15. A device as claimed in claim 1 wherein said hydrogen generation section is configured to deliver substantially pure hydrogen at said hydrogen output of said electrolysis unit.

16. A device as claimed in claim 1 wherein:
   said device comprises an engine configured to generate torque; and
   said engine generates said exhaust.

17. A device as claimed in claim 16 wherein said engine comprises a diesel engine.

18. A device as claimed in claim 16 wherein said engine is configured such that said exhaust is characterized by an oxygen content of about 1 to about 20 percent, by weight.

19. A device as claimed in claim 1 wherein said device comprises:
- a vehicle body; and
- an engine configured to generate said exhaust and sufficient torque to accelerate said vehicle body.

20. A device as claimed in claim 19 wherein said device comprises a controller configured to deactivate said exhaust diverter where said vehicle body decelerates.

21. A device for generating hydrogen from a water vapor containing exhaust, said device comprising an exhaust diverter and a hydrogen generation section, wherein:
- said exhaust diverter is configured to divert a portion of said exhaust and deliver said diverted exhaust to said hydrogen generation section;
- said hydrogen generation section comprises an electrolysis unit;
- said electrolysis unit comprises an external box type manifold on an exhaust input side of said electrolysis unit;
- a width dimension of said electrolysis unit, defined along said external box type manifold is at least twice as large as a length dimension of said electrolysis unit, defined between said exhaust input side and an exhaust output side of said electrolysis unit; and
- said hydrogen generation section is configured to deliver said hydrogen at a hydrogen output of said electrolysis unit.

22. A device as claimed in claim 21 wherein flow field grooves defined by said electrolysis unit extend at least as far as said external box type manifold.

23. A device for generating hydrogen from a water vapor containing exhaust, said device comprising an exhaust diverter and a hydrogen generation section, wherein:
- said exhaust diverter is configured to divert a portion of said exhaust and deliver said diverted exhaust to said hydrogen generation section;
- said hydrogen generation section comprises an electrolysis unit;
- said electrolysis unit comprises an external box type manifold on an exhaust input side of said electrolysis unit;
- said external box type manifold is tapered from a maximum cross sectional area at an input side of said manifold to a minimum cross sectional area at an terminal end of said manifold; and
- said hydrogen generation section is configured to deliver said hydrogen at a hydrogen output of said electrolysis unit.

24. A device comprising an engine configured to generate torque and a nitrogen oxide containing exhaust, at least one peripheral system, and a $NO_X$ removal system for removing nitrogen oxides from said nitrogen oxide containing exhaust, said $NO_X$ removal system comprising a $NO_X$ treatment section, an exhaust diverter, and a hydrogen generation section, wherein:
- said $NO_X$ treatment section is configured to remove nitrogen oxides from said exhaust;
- said exhaust diverter is configured to divert a portion of said exhaust to said hydrogen generation section;
- said hydrogen generation section is configured to generate $O_2$ as a byproduct of hydrogen generation and separate said $O_2$ from $H_2$ generated in said hydrogen generation section;
- said hydrogen generation section is configured to deliver said $H_2$ separate from said $O_2$ to said $NO_X$ treatment section,
- said hydrogen generation section is configured to deliver said $O_2$ separate from said $H_2$ to said peripheral system.

25. A device as claimed in claim 24 wherein said peripheral system comprises a fuel injection system of said engine.

26. A device as claimed in claim 24 wherein said peripheral system comprises an engine cooling system.

27. A device as claimed in claim 24 wherein said peripheral system comprises a suspension system.

28. A device as claimed in claim 24 wherein said peripheral system comprises a gaseous filter regeneration system.

29. A device as claimed in claim 24 wherein said peripheral system comprises a hydrogen storage system.

30. A device as claimed in claim 29 wherein said hydrogen storage system comprises hydrogen dispensing hardware.

31. A device for generating hydrogen from a water vapor containing exhaust, said device comprising an exhaust diverter and a hydrogen generation section, wherein:
- said device is free of a condensation unit which would otherwise enable delivery of water to said hydrogen generation section;
- said exhaust diverter is configured to direct water vapor containing exhaust to said hydrogen generation section without substantial condensation of water vapor in said diverted exhaust;
- said hydrogen generation section comprises an electrolysis unit defining a hermetically sealed void volume configured to accumulate and store hydrogen generated by said electrolysis unit directly from water vapor in said water vapor containing exhaust; and
- said hydrogen generation section is configured to deliver said hydrogen at a hydrogen output of said electrolysis unit.

* * * * *

UNITED STATES PATENT AND TRADEMARK OFFICE
CERTIFICATE OF CORRECTION

PATENT NO. : 6,981,367 B2 Page 1 of 1
APPLICATION NO. : 10/606194
DATED : January 3, 2006
INVENTOR(S) : Childs et al.

It is certified that error appears in the above-identified patent and that said Letters Patent is hereby corrected as shown below:

Col. 10, line 16 "section," should read --section;--.

Signed and Sealed this

First Day of August, 2006

JON W. DUDAS
*Director of the United States Patent and Trademark Office*